US005736224A

United States Patent [19]

Dodge

[11] Patent Number: 5,736,224

[45] Date of Patent: Apr. 7, 1998

[54] NAPKIN

[75] Inventor: Bernard E. Dodge, Palatka, Fla.

[73] Assignee: Georgia-Pacific Corporation, Atlanta, Ga.

[21] Appl. No.: 664,690

[22] Filed: Jun. 17, 1996

[51] Int. Cl.[6] .............................. B32B 3/00; B32B 23/02

[52] U.S. Cl. .......................... 428/156; 428/153; 428/157; 428/176; 428/177; 428/181; 428/192; 428/212

[58] Field of Search .................................... 428/156, 172, 428/192, 176, 181, 152, 153, 157, 177, 212, 537.5; D6/595; 604/358

[56] References Cited

U.S. PATENT DOCUMENTS

| | | | |
|---|---|---|---|
| D. 187,174 | 2/1960 | Shook | D87/3 |
| 1,929,924 | 10/1933 | Jopson | 41/24 |
| 3,673,060 | 6/1972 | Murphy et al. | 156/163 |
| 4,100,017 | 7/1978 | Flantt | 428/154 |
| 4,307,141 | 12/1981 | Walburn | 428/132 |
| 4,320,162 | 3/1982 | Schulz | 428/154 |
| 4,803,032 | 2/1989 | Schulz | 264/284 |
| 4,921,034 | 5/1990 | Burgess et al. | 162/109 |
| 4,942,077 | 7/1990 | Wendt et al. | 428/152 |
| 5,093,068 | 3/1992 | Schulz | 264/284 |
| 5,415,918 | 5/1995 | Lang et al. | 428/154 |
| 5,458,950 | 10/1995 | Bredenick et al. | 428/154 |

*Primary Examiner*—Donald Loney
*Attorney, Agent, or Firm*—Banner & Witcoff, Ltd.

[57] ABSTRACT

A napkin is folded so that certain layers include marginal portions which extend beyond the remaining layers. The marginal portions are provided with a deeper embossing pattern than the remaining portions of the napkin to provide enhanced banding and handling of a stack of napkins.

18 Claims, 5 Drawing Sheets

NAPKIN

FIELD OF THE INVENTION

The present invention pertains to a napkin, and in particular to a folded napkin with unequal layers. While these napkins are designed primarily for use in restaurants, they are not limited to such an environment.

BACKGROUND OF THE INVENTION

Napkins are usually formed of single sheets of embossed paper which are folded into a multiple of overlying sections or layers. For example, in one common six layer napkin, the sheet will include one primary fold line which divides the sheet into two panels, and two secondary fold lines which divide the two panels into six sections. The sheet is folded about the fold lines so that the sections overlie one another.

Originally, the primary fold line was centered on the sheet so that the panels were of equal size. This construction resulted in a stack of napkins which was relatively stable and uniform. Accordingly, these napkins were easy to band into a stack for distribution. Moreover, the stacks tended to be even and relatively solid, which in turn, made them easy to handle and load into dispensers.

In recent times, the primary fold line has been offset from the center of the sheet so that one panel is one inch shorter than the other panel. As can be appreciated, this construction reduces the overall size of the sheet without reducing the visible surface area of the napkin when folded. The cost of supplying the restaurant or other establishment with napkins is thereby reduced because less paper is needed to make each napkin. In addition, by maintaining the apparent visible size of the napkin, the napkins are readily accepted by the general public.

Nevertheless, use of napkins with an offset fold line has not been entirely satisfactory. Locating the primary fold line off the center of the sheet causes one end of the napkin to have only one-half the number of layers which are included at the other end. Due to the uneven bulk, banding of the stack causes the end with fewer layers to be compressed, which deforms and crushes the ends of the napkins. As a result, these napkins have a diminished aesthetic appeal. Moreover, the crushed end of the stack has a tendency to slightly collapse and slip from ones hand when grasped, thus making handling more difficult.

The problems associated with these napkins are exacerbated as the offset is enlarged. An extension of the offset beyond one inch typically results in the napkins being unacceptable due to excessive amounts of crushing. In fact, napkins formed with a three inch offset are too uneven to permit banding by the manufacturing machinery currently in use. Consequently, the industry has been effectively limited to a one-inch offset in producing these type of napkins.

SUMMARY OF THE INVENTION

The present invention is directed to a napkin with unequal layers which does not suffer from the handling and banding difficulties of the past. Moreover, offsets as large as three inches or possibly more can be banded and handled without the detrimental affects experienced with conventional napkins.

A napkin in accordance with the present invention is formed with a selective bilevel embossing pattern. More specifically, the napkin includes an offset primary fold line. The offset fold line creates a marginal portion along some of the layers which extends beyond the remaining layers. The marginal portion is formed with a deeper embossing pattern than the remaining portion of the napkin to compensate for the otherwise reduced bulk. The inventive napkin thus forms a relatively stable stack which bands well without significant crushing.

DETAILED DESCRIPTION OF THE PREFERRED EMBODIMENT

Figure 1:
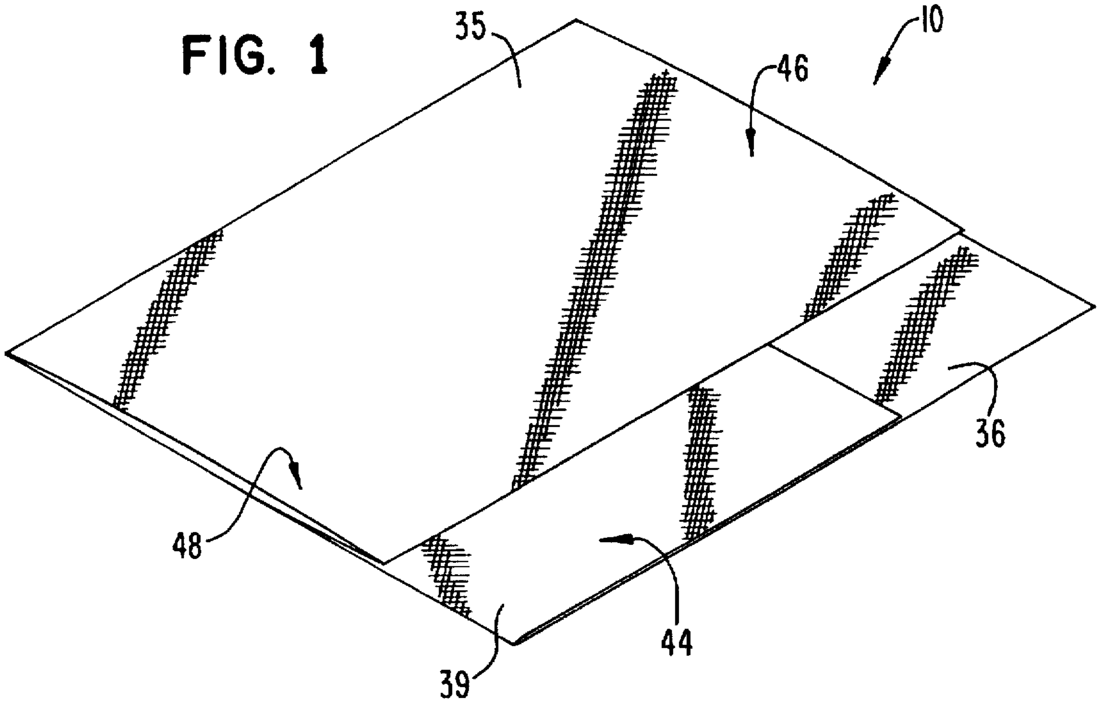
FIG. 1 is a perspective view of a napkin in accordance with the present invention.
Figure 2:
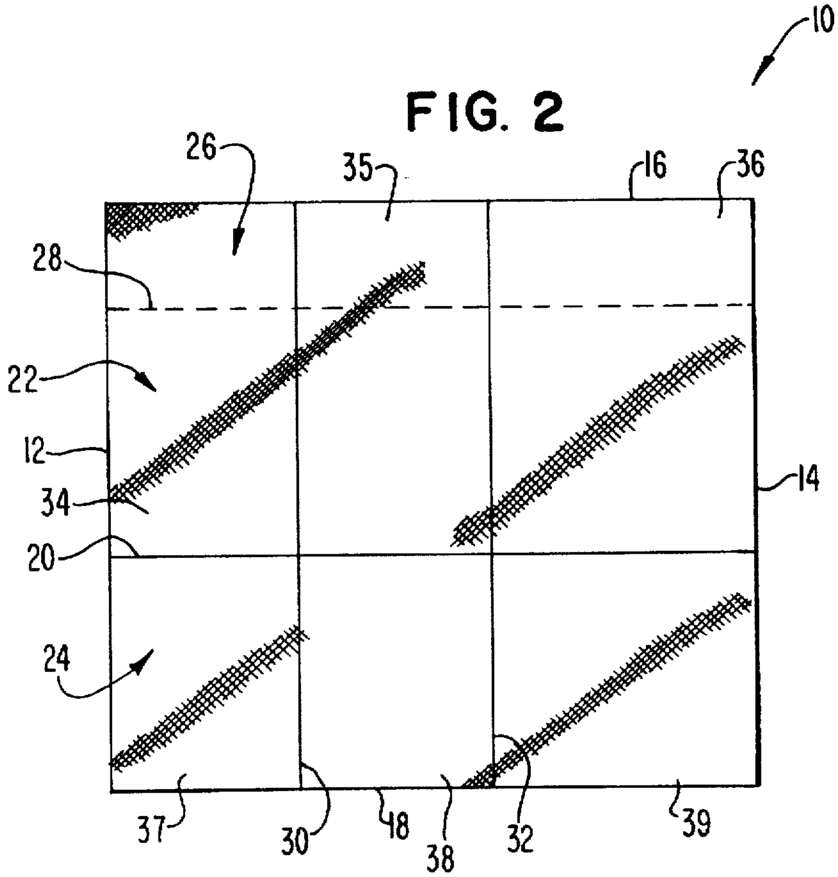
FIG. 2 is an unfolded blank of the napkin.

A napkin 10 in accordance with the present invention is formed of a single sheet of paper (FIGS. 1–4). For illustrative purposes only, this application discusses the invention in conjunction with a six-layer napkin having a particular fold pattern. However, the invention is applicable to napkins having a different number of layers and different fold patterns.

Napkin 10 is initially formed as an unfolded blank (FIG. 2) having end edges 12, 14 and side edges 16, 18. A primary fold line 20 extends longitudinally across napkin 10 in a generally parallel relationship with side edges 16, 18 to define a pair of panels 22, 24. Of course, other primary fold lines could also be provided. Fold line 20 is offset from the centerline of napkin 10 so as to be nearer to side edge 18 than side edge 16. Accordingly, panel 24 is narrower or shorter along its width than panel 22. Panel 22 therefore includes a marginal portion 26, between dashed line 28 and side edge 16, which extends beyond panel 24 when folded about fold line 20. The width of marginal portion 26 (i.e., the distance from side edge 16 to dashed line 28) is subject to change and can be as much as three inches or possibly more.

A plurality of secondary fold lines 30, 32 extend across napkin 10 generally perpendicular to primary fold line 20 to subdivide panels 22, 24 into six sections 34–39. Of course, any number of secondary fold lines or even no secondary fold lines could be used. The sections 34–39 can be of equal or unequal size. In the illustrated embodiment, sections 34, 35, 37, 38 are of about the same size, but smaller than sections 36, 39; that is, the distance between fold line 32 and end edge 14 is greater than the distance between end edge 12 and fold line 30 or the distance between the two fold lines 30, 32.

Figure 3:
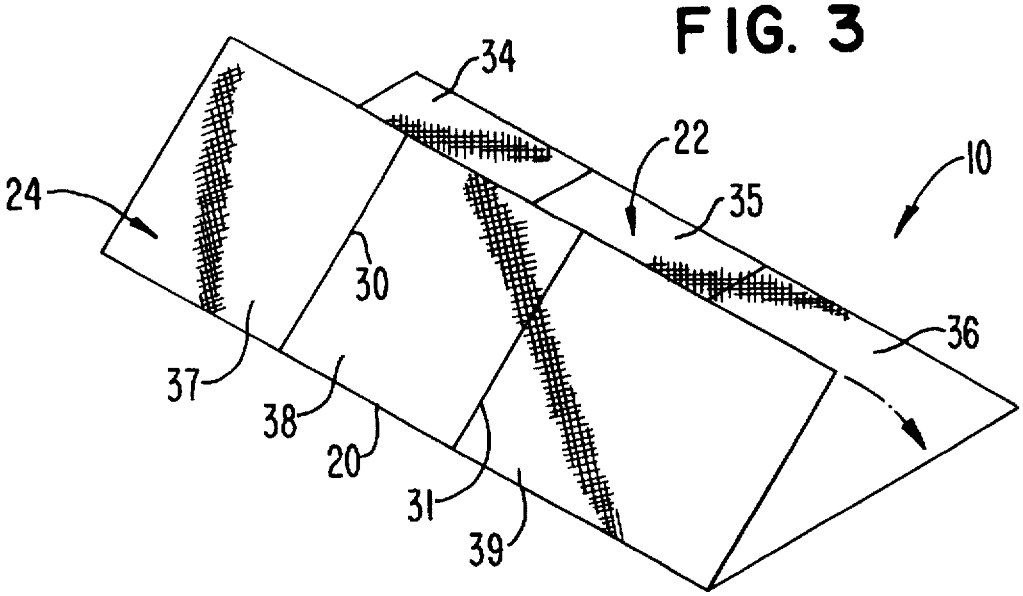
FIGS. 3 and 4 are perspective views of the napkin in different stages of being folded.
Figure 4:
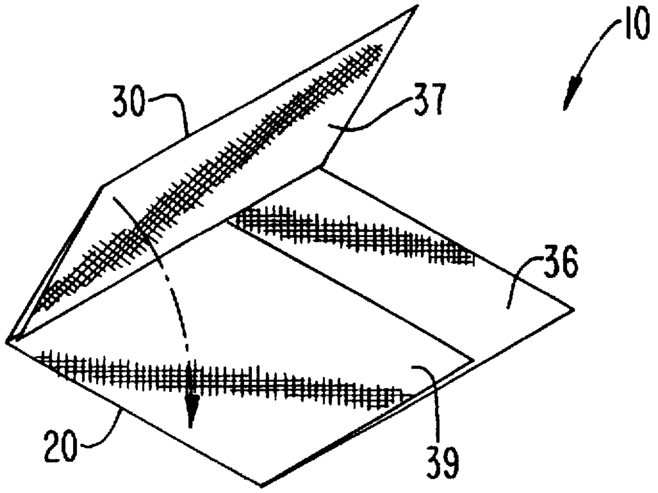

Napkin 10 is initially folded about primary fold line 20 so that panels 22, 24 overlie one another (FIG. 3). In particular, section 37 overlies section 34, section 38 overlies section 35, and section 39 overlies section 36. When folded about line 20, side edge 18 will be aligned along dashed line 28. As a result, the marginal portion 26 of panel 22 extends beyond panel 24. Thereafter, napkin 10 is successively folded about secondary fold lines 30, 32 (FIG. 4). Superposed sections 34, 37 are folded about fold line 30 to overlie superposed sections 35, 38. These four superposed sections 34, 35, 37, 38 are then folded about fold line 32 to overlie superposed sections 36, 39. In the present example, an end portion 44 of superposed sections 36, 39 extends beyond sections 34, 35, 37, 38; nevertheless, portion 44 could be eliminated so that the superposed sections are all the same size.

When napkin 10 is fully folded, a first side 46 defined by marginal portion 26 has fewer layers than the opposite, second side 48 (FIG. 1). In the illustrated example, the first side 46 includes three layers, whereas the second side 48 has six layers. To compensate for the reduced bulk along first side 46, marginal portion 26 is provided with a deeper embossing pattern than the remainder of the napkin. This selective bilevel embossing of the napkins overcomes the stacking and handling problems of the prior art. As an alternative, the napkin could possibly be embossed along the marginal portion while the remaining portion of the napkin remains unembossed. In the same way, the embossing pattern along the marginal portion would compensate for the reduced bulk caused by the fewer layers.

Figure 5:
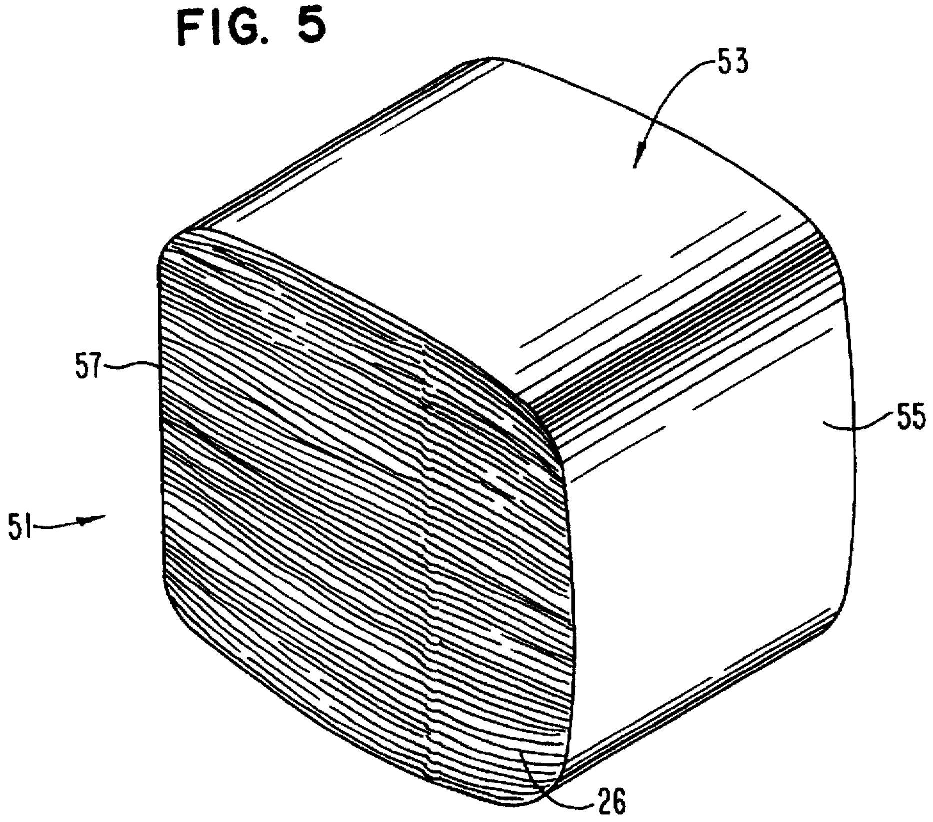
FIG. 5 is a perspective view of a stack of the inventive napkins.
Figure 6:
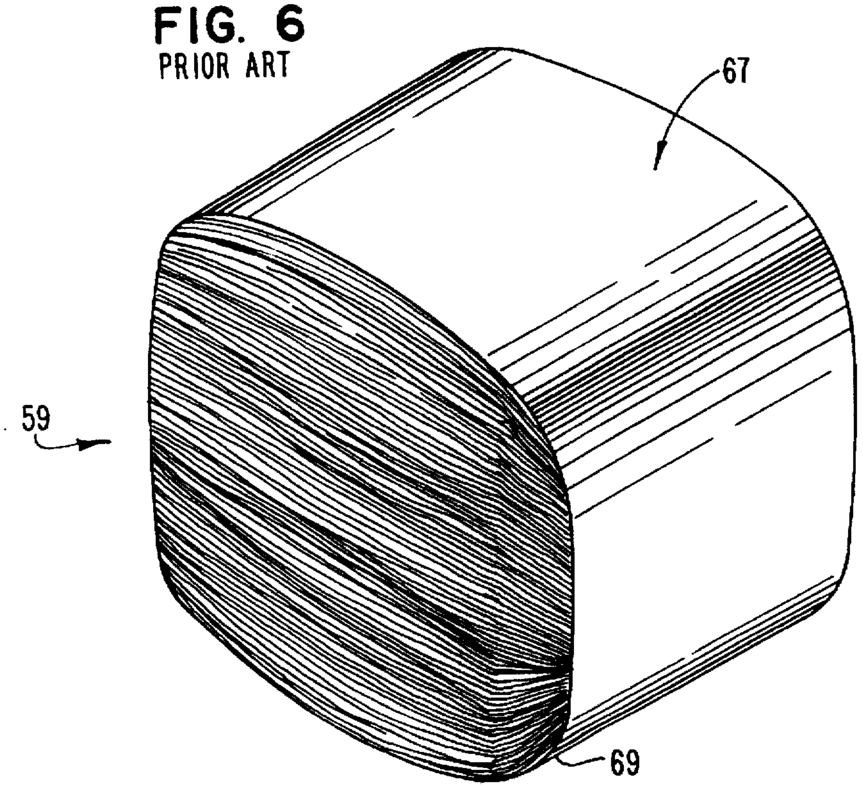
FIG. 6 PRIOR ART
FIG. 6 is a stack of prior art napkins.
Figure 7:
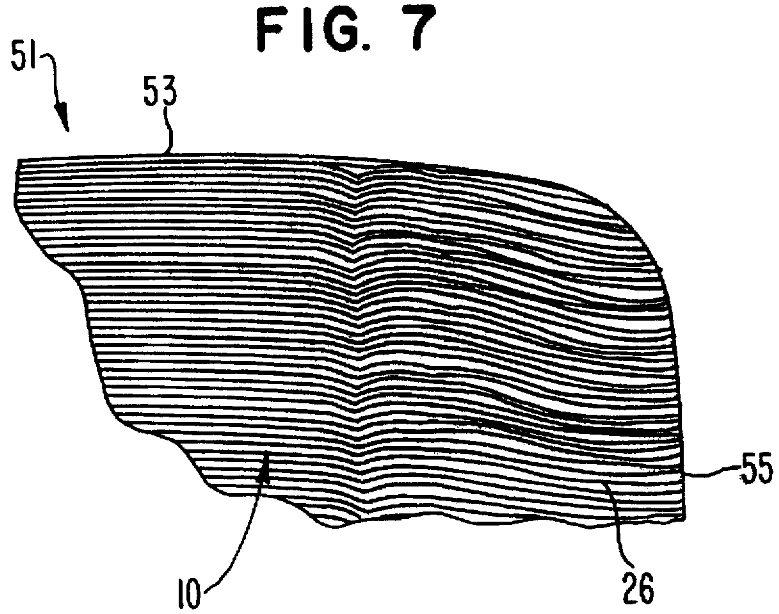
FIG. 7 is an enlarged, partial end view of the stack of FIG. 5.
Figure 8:
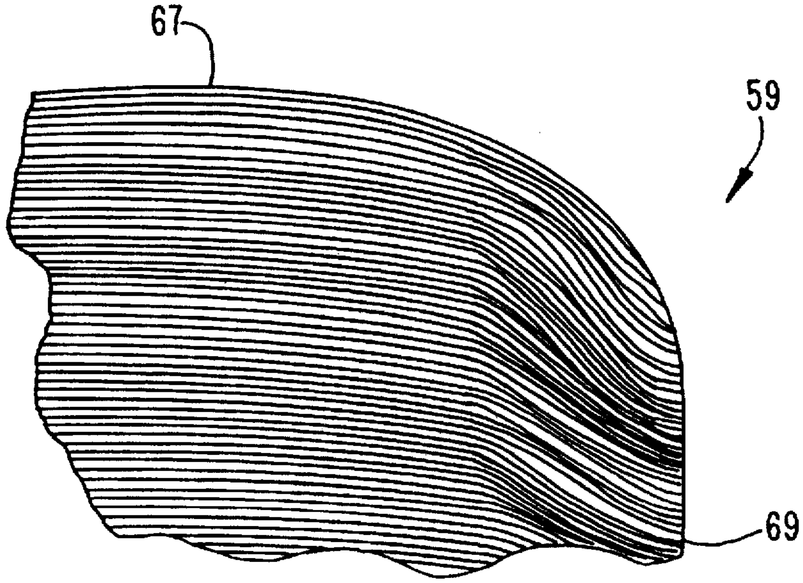
FIG. 8 PRIOR ART
FIG. 8 is an enlarged partial end view of the stack of FIG. 6.

Napkins 10 are packaged in a stack 51 secured by an encircling band 53. Due to the increased bulk provided by the deeper embossing pattern, the stack is generally uniform across its width. As a result, the banded stack has about the same firmness and thickness on side 55 containing marginal portions 26 as side 57 containing the greater number of layers—even with a two inch marginal portion as shown (FIGS. 5 and 7). In contrast, in a stack 59 of prior art napkins having only a one inch marginal portion (but without the bilevel embossing), the band 67 presses against the marginal portions 69 to crush and disfigure the napkins, particularly along the corners of the stack (FIGS. 6 and 8). As can be appreciated, napkins 10 stack and band better than prior art napkins even when provided with larger marginal portions. Due to the direction of the banding, the existence of end portions 44 with reduced layers has not been a source of problems.

The embossing patterns on the napkin are preferably formed on the napkin by a pair of embossing rolls as is known in the art. A male steel roll 54 for this process is formed with a cylindrical working face 56 and a pair of stub shafts 58 for rotative mounting of the roll. The male steel roll 54 may be opposed by a mating female roll or a roll with an exterior elastomeric surface. A typical roll 54 has a working face 56 provided with a pattern of peaks and valleys for embossing the paper. A sheet of paper is fed from a spool between the opposed embossing rolls. After embossing, the sheet is cut longitudinally and laterally into the blanks for forming napkins 10.

Figure 9:
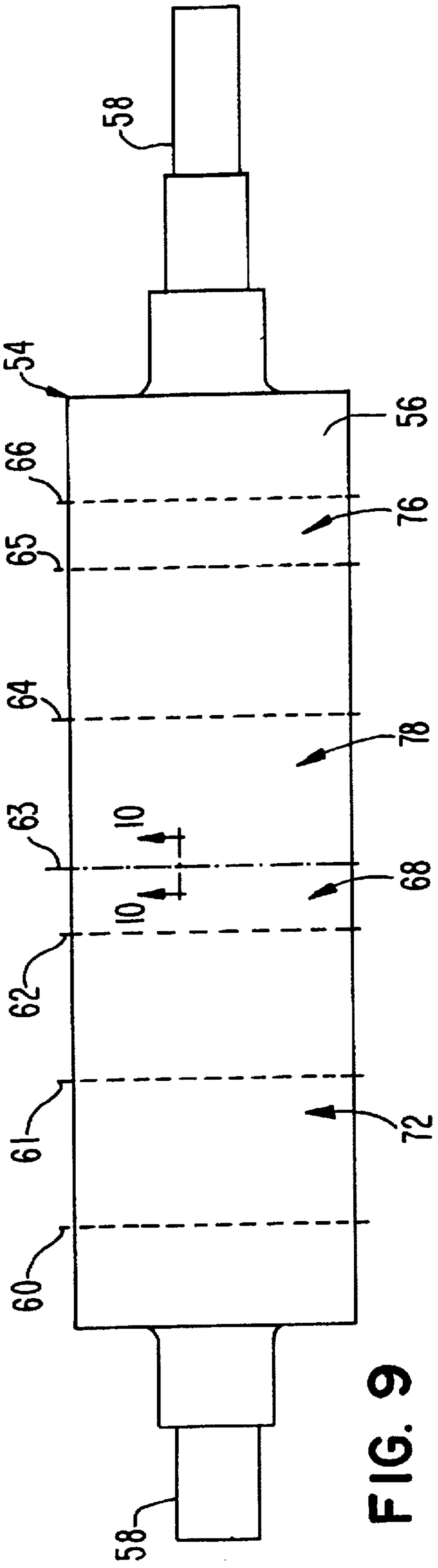
FIG. 9 is a side elevational view of an embossing roll for producing the napkin.
Figure 10:
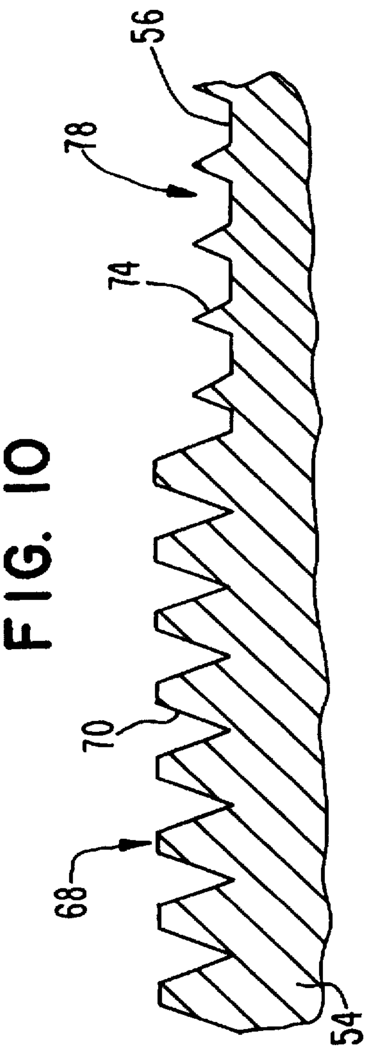
FIG. 10 is a partial cross-sectional view of the embossing roll taken along line 10—10.

More specifically, dashed lines 60–66 are superimposed over roll 54 (FIG. 9) to illustrate the manner in which the paper is preferably embossed. The paper passes over working face 56 of embossing roll 54 as a continual strip of paper which is later cut. Roll 54 simultaneously embosses two napkins across its width; that is, dashed line 63 represents the location of a slit line for the paper to be longitudinally cut after embossing. As a result, one series of napkins is embossed to the right of line 63 and one series of napkins is embossed to the left of line 63. The roll segment 68 between lines 62 and 63 is provided with peaks 70 to form the deeper embossing pattern in the paper. Segment 68 defines the marginal portions 26 for one series of napkins 10. Dashed line 61 corresponds to the location of the primary fold line 20 during a later folding operation for the same napkin. Dashed line 60 corresponds with end edge 18 of napkin 10. The segment 72 of working face 56 between lines 60 and 62 includes peaks 74 which form the shallower embossing paper in the paper.

Dashed line 64 represents the location of the primary fold line 20 for the other series of napkins in a later folding operation. Segment 76 of working face 56 between lines 65 and 66 are provided with the higher peaks 70 to define the deeper embossing pattern on marginal portion 26 of the other series of napkins. Segment 78 between lines 63 and 65 includes peaks 74 forming the shallower embossing pattern in the paper. A uniform embossing pattern is preferably used across the entire napkin. Nonetheless, variations or omissions in the embossing patterns could be included to provide visual designs on the paper.

In the preferred embodiment, peaks 70 have a generally frustoconical shape and peaks 74 have a generally conical shape. In this way, the distinction between the embossing patterns in the final appearance of the napkin to the end user is minimized. More specifically, when a stack of napkins is banded, the portions of the napkins 10 having the additional layers are pressed together with more force than the marginal portions 26. As a result, the sharper dimples in the paper formed by peaks 74 are crushed slightly. This slight crushing of the shallower embossing pattern causes the dimples to appear to be very similar to the dimples associated with the deeper embossing pattern. In one preferred example, the height of peaks 70 are 0.011 inches and the height of peaks 74 are 0.0055 inches. Of course, other embossing shapes, patterns or sizes could be used. For instance, either of the peaks 70, 74 could have a conical, frusto-conical, or other shape. Further, the spacings between the peaks could be varied.

The above discussion concerns the preferred embodiments of the present invention. Various other embodiments as well as many changes and alterations may be made without departing from the spirit and broader aspects of the invention as defined in the claims.

I claim:

1. A napkin comprising a sheet of paper having at least one fold line to define a plurality of overlapping sections, at least one section being larger than at least one other section such that each larger section defines a marginal portion along one side of the napkin that extends beyond each other section, each said marginal portion including a first embossing pattern and the remainder of the napkin including a second embossing pattern, the first embossing pattern being generally deeper than said second embossing pattern and formed in substantially only said marginal portion.

2. A napkin in accordance with claim 1 wherein said first embossing pattern includes dimples with a generally flat apex, and wherein said second embossing pattern includes dimples with a generally sharp apex.

3. A napkin in accordance with claim 2 wherein said dimples of said first embossing pattern are about twice as deep as said dimples of said second embossing pattern.

4. A napkin in accordance with claim 1 wherein said dimples of said first embossing pattern are about twice as deep as said dimples of said second embossing pattern.

5. A napkin in accordance with claim 1 wherein each said marginal portion extends beyond each said other section by more than one inch.

6. A napkin in accordance with claim 1 which further includes a plurality of fold lines, wherein at least two of said fold lines are generally perpendicular to each other.

7. A napkin in accordance with claim 1 which further includes a primary fold line that extends parallel to but spaced from a centerline of said sheet, and a plurality of spaced apart secondary fold lines that extend generally perpendicular to said primary fold line.

8. A napkin in accordance with claim 1 wherein said first embossing pattern extends uniformly across the entire marginal portion.

9. A napkin in accordance with claim 8 wherein said second embossing pattern extends uniformly across the remaining portion of the napkin.

10. A napkin comprising a sheet of paper having at least one fold line to define a plurality of overlapping sections, at least one section being larger than at least one other section such that each larger section defines a marginal portion along one side of the napkin that extends beyond each other section, each said marginal portion being embossed to be generally thicker than the remaining portion of the napkin.

11. A napkin in accordance with claim 10 wherein said remaining portion of the napkin is formed with an embossing pattern which is shallower than said embossing pattern of said marginal portion.

12. A napkin in accordance with claim 11 wherein said embossing pattern of said marginal portion is about twice as deep as the embossing pattern of said remaining portion of the napkin.

13. A napkin in accordance with claim 11 wherein said first embossing pattern extends across the entire marginal portion and said second embossing pattern extends across the entire remaining portion of the napkin.

14. A napkin comprising a sheet of paper having at least one fold line to define a plurality of overlapping sections and a pair of opposite sides, one of said sides of the napkin having fewer overlapping sections than said opposite side, said sections on said one side with fewer sections being embossed so that said one side generally has the same thickness as the opposite side of the napkin.

15. A napkin in accordance with claim 14 wherein said remaining portion of the napkin is formed with an embossing pattern which is shallower than said embossing pattern on said side with fewer sections.

16. A napkin comprising a single sheet of paper having a pair of side edges, a pair of end edges, a primary fold line extending generally parallel to said side edges to define first and second panels which overlap one another, and at least one secondary fold line extending generally perpendicular to said primary fold line to divide the panels into a plurality of sections, said primary fold line being spaced farther from one of said side edges than the other of said side edges so that said first panel is larger than said second panel, said first panel including a marginal portion along said one side edge that extends beyond said second panel, said marginal portion being formed with an embossing pattern having a first depth, the remaining portion of the napkin being formed with an embossing pattern having a second depth which is less than said first depth said embossing pattern with said first depth being formed substantially only in said marginal portion.

17. A napkin in accordance with claim 16 wherein said first embossing pattern includes dimples with a generally flat apex, and wherein said second embossing pattern includes dimples with a generally sharp apex.

18. A napkin in accordance with claim 16 wherein said first embossing pattern extends across the entire marginal portion, and said second embossing pattern extends across the remaining portion of the napkin.

* * * * *